Jan. 17, 1956  A. E. DENTLER  2,731,259
RUBBER CUSHIONING MECHANISMS
Filed April 28, 1953  2 Sheets-Sheet 1

Inventor:
Arnold E. Dentler.
By Henry Fuchs
Atty.

Jan. 17, 1956  A. E. DENTLER  2,731,259
RUBBER CUSHIONING MECHANISMS
Filed April 28, 1953  2 Sheets-Sheet 2

Inventor:
Arnold E. Dentler.
By Henry Fuchs.
Atty.

United States Patent Office 2,731,259
Patented Jan. 17, 1956

2,731,259

RUBBER CUSHIONING MECHANISMS

Arnold E. Dentler, Western Springs, Ill., assignor to W. H. Miner, Inc., Chicago, Ill., a corporation of Delaware Application April 28, 1953, Serial No. 351,639

3 Claims. (Cl. 267—63)

This invention relates to improvements in rubber cushioning mechanisms.

One object of the invention is to provide a rubber cushioning mechanism, composed of a stack of units, each unit comprising a pair of metal plates and a rubber pad interposed between said plates, wherein each unit is flat on one side and has the other side thereof concavely curved inwardly toward said flat side, thereby providing each of said units of the stack with thickened border portions to be compressed in advance of the entire volume of each unit to provide for soft initial action of the mechanism.

A more specific object of the invention is to provide a rubber cushioning mechanism comprising a plurality of units arranged in the formation of a pack, each unit of which is composed of a pair of metal plates and a rubber pad interposed between the plates, wherein the rubber pad has one side thereof formed flat and the opposite side thereof bowed inwardly toward said flat side, and one of said plates of said unit is flat to fit said flat side of the pad and the other of said plates is curved to fit the inwardly bowed side of the pad, and wherein the units are arranged in said pack with the flat plates facing the curved plates.

Other objects of the invention will more clearly appear from the description and claims hereinafter following.

In the accompanying drawings forming a part of this specification,

Figure 1:
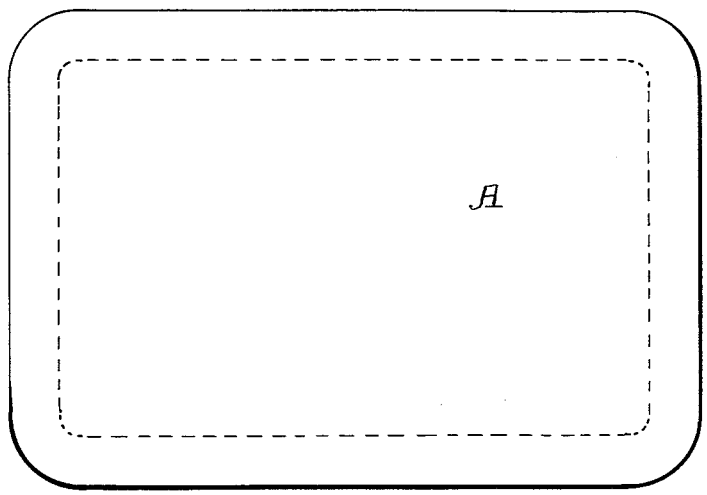
Figure 1 is a top plan view of my improved rubber cushioning mechanism.
Figure 2:
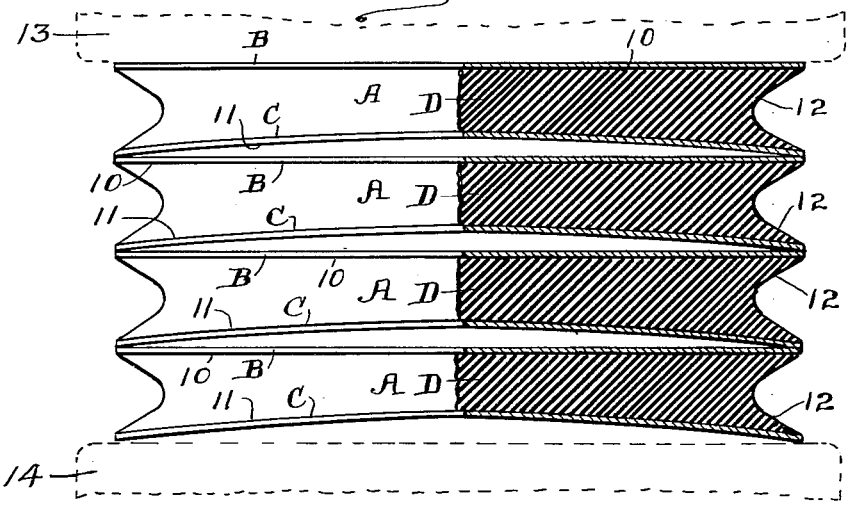
Figure 2 is a part side elevational and part longitudinal, vertical sectional view of Figure 1.

My improved shock absorbing mechanism, as shown in Figures 1 and 2 of the drawings, comprises broadly a plurality of units A—A—A—A, arranged in the form of a pack or stack, each unit being composed of a pair of metal plates B and C, and an interposed rubber pad or mat D.

The plates B and C of each unit are of rectangular outline with rounded corners and of the same size.

The rubber pad D of each unit corresponds in size and outline to the plates B and C and is interposed between these plates. The pad D of each unit has its top side, which is indicated by 10, formed flat, and its bottom side, which is indicated by 11, bowed upwardly lengthwise of said pad, as shown in Figure 2. The four edges of each pad are indented or grooved, as indicated at 12. These indentations or grooves are of such a depth and transverse cross section that, when the unit is compressed to a predetermined extent, the material of the pad throughout the height of the edges thereof, will be flush or in vertical alignment with the edges of the plates B and C.

The plates B and C of each unit A are respectively flat and curved to snugly fit against the flat and bowed sides 10 and 11 of the pad D. The pad D is preferably vulcanized to the plates B and C.

In the complete pack or stack, as shown in Figure 2, the units A—A—A—A have their bottom sides arched upwardly away from the top flat sides of adjacent units, thus providing contact between adjacent units at the thickened ends thereof only, in the normal condition of the parts, that is, when the shock absorbing mechanism is in expanded condition.

As illustrated in Figure 2, my improved rubber shock absorbing mechanism is employed to absorb the shocks between two relatively movable members, such as followers 13 and 14, shown in dotted lines. Upon relative approach of the followers 13 and 14, the stack of units A—A—A—A is compressed therebetween, the rubber pads or mats of the individual units A being first compressed at their thickened opposite ends, thus providing soft initial action. As compression of the stack progresses, the units A—A—A—A will be gradually flattened out, the area of contact progressively increasing with a corresponding stiffening of the resistance, until the flattening of each individual unit becomes complete, after which the entire volume of each unit becomes effective to actively absorb shocks.

Figure 3:
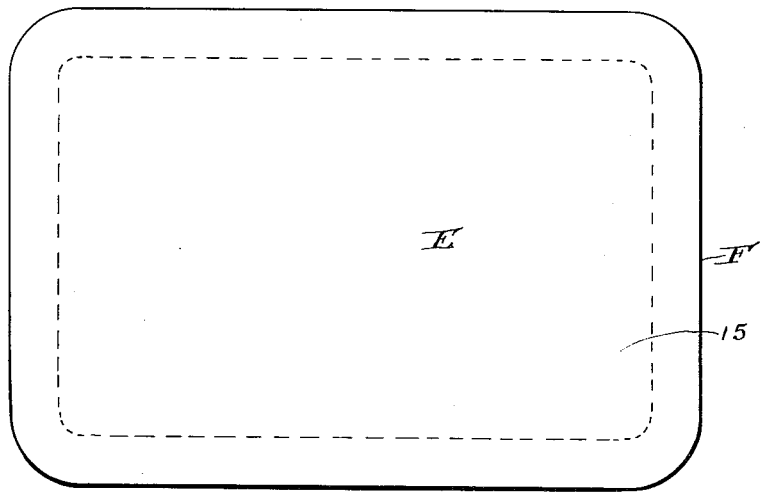
Figure 3 is a plan view of a rubber unit, illustrating another embodiment of the invention.
Figure 4:
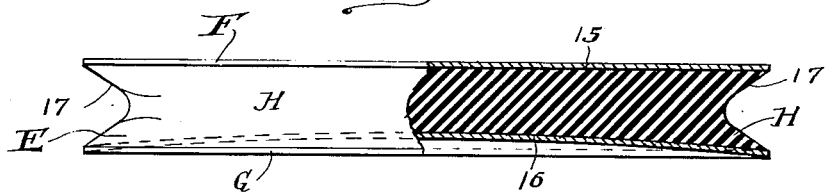
Figure 4 is a part side elevational and part longitudinal, vertical sectional view of Figure 3.
Figure 5:
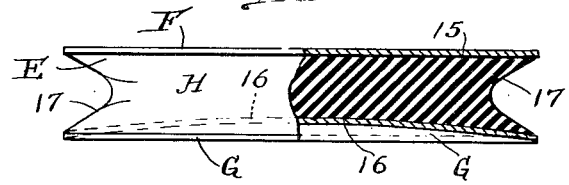
Figure 5 is a part end elevational and part transverse, vertical sectional view of Figure 3.

Referring next to the embodiment of the invention illustrated in Figures 3, 4, and 5, a shock absorbing unit, indicated by E, is shown. A plurality of such units are employed in the complete shock absorber, the same being arranged in a stack or pack in a manner similar to the units A—A—A—A in Figure 2. The unit E, as shown in Figures 3, 4, and 5, comprises a pair of metal plates F and G and an interposed rubber pad H.

The plates F and G of each unit are of rectangular outline, and the interposed pad H corresponds in size and outline to these plates. The pad has the top side thereof, which is indicated by 15, formed flat, and its bottom side, which is indicated by 16, bowed upwardly in both longitudinal and transverse directions to provide a truly concave surface. The four edges of the pad H are indented or grooved in a manner similar to and for the same purpose as the pad D hereinbefore described, said indentations of the pad H being indicated by 17—17—17—17. The plates F and G of the unit E are, respectively, flat and concavo-convexly curved to snugly fit against the flat and convex sides 15 and 16 of the pad H, and the latter is secured to the plates F and G by being vulcanized to the same. As is evident, the unit E is similar to the unit A hereinbefore described, with the exception that the bottom side face of the same is truly concave, instead of being bowed inwardly only in direction lengthwise of the unit as is the case in connection with the unit A.

I claim:

1. A shock absorbing mechanism comprising a plurality of units arranged in series, each unit comprising a pair of metal plates and a rubber pad interposed between and bonded to said plates, one of said plates of each unit being flat and the other plate thereof being curved, adjacent units facing each other, the flat plate of each unit facing the curved plate of the adjacent unit.

2. A shock absorbing mechanism comprising a plurality of units arranged in series, each unit comprising a pair of metal plates and a rubber pad interposed between said plates, one of said plates of each unit being flat and the other plate thereof being curved, adjacent units facing each other with the flat curved plate of each unit opposed to the flat plate of the adjacent unit and arched away from said flat plate.

3. A shock absorbing mechanism comprising a plurality of elongated units arranged in stack formation, each unit comprising a pair of metal plates and a rubber pad interposed between said plates, said pad of each unit having one side thereof formed flat and the other side bowed inwardly toward said flat side, and the plates of each of said units being respectively bowed and flat to fit said flat and inwardly bowed sides of said pad, said units being arranged with the flat plates of each opposed to the inwardly bowed plates of the adjacent units.

References Cited in the file of this patent

UNITED STATES PATENTS

| | | |
|---|---|---|
| 137,295 | Daniels | Apr. 1, 1873 |
| 2,165,383 | Johnson et al. | July 11, 1939 |
| 2,260,532 | Lindeman | Oct. 28, 1941 |

FOREIGN PATENTS

| | | |
|---|---|---|
| 762,631 | France | Jan. 22, 1934 |
| 899,377 | France | Aug. 7, 1944 |